US012794951B2

(12) United States Patent
Henry et al.

(10) Patent No.: US 12,794,951 B2
(45) **Date of Patent: *Nov. 10, 2026**

(54) CLIENT-DRIVEN RANDOMIZED AND CHANGING MEDIA ACCESS CONTROL (MAC) ADDRESS (RCM) MECHANISM

(71) Applicant: Cisco Technology, Inc., San Jose, CA (US)

(72) Inventors: Jerome Henry, Pittsboro, NC (US); Robert E. Barton, Richmond (CA); Stephen Michael Orr, Wallkill, NY (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 71 days.

This patent is subject to a terminal disclaimer.

(21) Appl. No.: 18/817,942

(22) Filed: Aug. 28, 2024

(65) Prior Publication Data

US 2024/0422202 A1 Dec. 19, 2024

Related U.S. Application Data

(63) Continuation of application No. 17/673,310, filed on Feb. 16, 2022, now Pat. No. 12,160,452.

(51) Int. Cl.
*G06F 21/62* (2013.01)
*H04L 9/40* (2022.01)
(Continued)

(52) U.S. Cl.
CPC ............ *H04L 63/205* (2013.01); *H04L 61/50* (2022.05); *H04W 12/009* (2019.01); *H04L 2101/622* (2022.05)

(58) Field of Classification Search
CPC . H04L 63/205; H04L 61/50; H04L 2101/622; H04L 61/5038; H04W 12/009; H04W 12/02
See application file for complete search history.

(56) References Cited

U.S. PATENT DOCUMENTS 8,819,769 B1 8/2014 Van et al.
10,506,497 B2 12/2019 Chen et al.
(Continued)

FOREIGN PATENT DOCUMENTS

WO 2016032385 A1 3/2016
WO WO-2025049768 A1 * 3/2025 ......... H04L 61/5092

OTHER PUBLICATIONS

Tess Despres, Noelle Davis, Prabal Dutta, David Wagner; "DeTag Live: Linking MACs to Protect Against Malicious BLE Trackers"; SNIP2+ '23: ACM Proceedings of the Second Workshop on Situating Network Infrastructure with People, Practices, and Beyond; Sep. 10, 2023, pp. 1-7 (Year: 2023).*
(Continued)

*Primary Examiner* — Fatoumata Traore
*Assistant Examiner* — Courtney D Fields
(74) *Attorney, Agent, or Firm* — Edell, Shapiro & Finnan, LLC

(57) ABSTRACT

Techniques are provided for client-driven Randomized and Changing Media Access Control (MAC) address (RCM) mechanisms. In one example, a wireless client is configured to wirelessly communicate with a wireless network. The wireless client obtains data relating to a level of security for one or more MAC addresses of the wireless client. Based on the data, the wireless client computes a score that represents the level of security for the one or more MAC addresses. Using the score, the wireless client determines when or how frequently to rotate the one or more MAC addresses. Based on determining when or how frequently to rotate the one or more MAC addresses, the wireless client rotates the one or more MAC addresses.

20 Claims, 5 Drawing Sheets

(51) Int. Cl.

| | |
|---|---|
| ***H04L 61/50*** | (2022.01) |
| ***H04W 12/00*** | (2021.01) |
| *H04L 101/622* | (2022.01) |
| *H04W 12/02* | (2009.01) |
| *H04W 12/73* | (2021.01) |
| *H04W 12/75* | (2021.01) |

(56) References Cited

U.S. PATENT DOCUMENTS

| | | | | |
|---|---|---|---|---|
| 2016/0135041 | A1 | 5/2016 | Lee et al. | |
| 2018/0115982 | A1* | 4/2018 | Reddy | H04B 17/318 |
| 2020/0344203 | A1 | 10/2020 | Mermoud et al. | |
| 2020/0351648 | A1 | 11/2020 | Fang | |
| 2021/0266319 | A1 | 8/2021 | Olshansky | |
| 2021/0360465 | A1* | 11/2021 | Henry | H02M 1/0029 |
| 2023/0354034 | A1* | 11/2023 | Ficara | H04W 12/73 |

OTHER PUBLICATIONS

Aruba: "Access Network Query Protocol," 1 Page, [Retrieved on Dec. 27, 2021] Retrieved from URL: https://www.arubanetworks.com/techdocs/ArubaOS_85_Web_Help/Content/arubaos-solutions/hotspot/anqp.htm.

Cisco: "Cisco AI Endpoint Analytics," Cisco DNA Center User Guide, Release 2.2.3, Oct. 28, 2021, 36 Pages.

Fenske E., et al., "Three Years Later: A Study of MAC Address Randomization in Mobile Devices and When It Succeeds," Sciendo, Proceedings on Privacy Enhancing Technologies, Mar. 16, 2021, vol. 3, pp. 164-181, DOI:10.2478/popets-2021-0042.

Tang L., et., "EM-MAC: A Dynamic Multichannel Energy-Efficient MAC Protocol for Wireless Sensor Networks", MobiHoc '11: Proceedings of the Twelfth ACM International Symposium on Mobile Ad Hoc Networking and Computing, May 17, 2011, Article No. 23, pp. 1-11.

* cited by examiner

CLIENT-DRIVEN RANDOMIZED AND CHANGING MEDIA ACCESS CONTROL (MAC) ADDRESS (RCM) MECHANISM

CROSS-REFERENCE TO RELATED APPLICATION

This application is a continuation of U.S. application Ser. No. 17/673,310, filed Feb. 16, 2022, now U.S. Pat. No. 12,160,452, issued Dec. 3, 2024, the entirety of which is incorporated herein by reference.

TECHNICAL FIELD

The present disclosure relates to computer networking.

BACKGROUND

Randomized and Changing Media Access Control (MAC) address (RCM) techniques enable a wireless client that is connected to a network to change its MAC address. For example, the wireless client might change its MAC address to obfuscate its identity from would-be hackers. Thus, RCM techniques can help prevent unauthorized tracking/fingerprinting of wireless clients.

DESCRIPTION OF EXAMPLE EMBODIMENTS

Overview

Techniques are provided herein for client-driven Randomized and Changing Media Access Control (MAC) address (RCM) mechanisms. In one example embodiment, a wireless client is configured to wirelessly communicate with a wireless network. The wireless client obtains data relating to a level of security for one or more MAC addresses of the wireless client. Based on the data, the wireless client computes a score that represents the level of security for the one or more MAC addresses. Using the score, the wireless client determines when or how frequently to rotate the one or more MAC addresses. Based on determining when or how frequently to rotate the one or more MAC addresses, the wireless client rotates the one or more MAC addresses.

Example Embodiments

Figure 1:
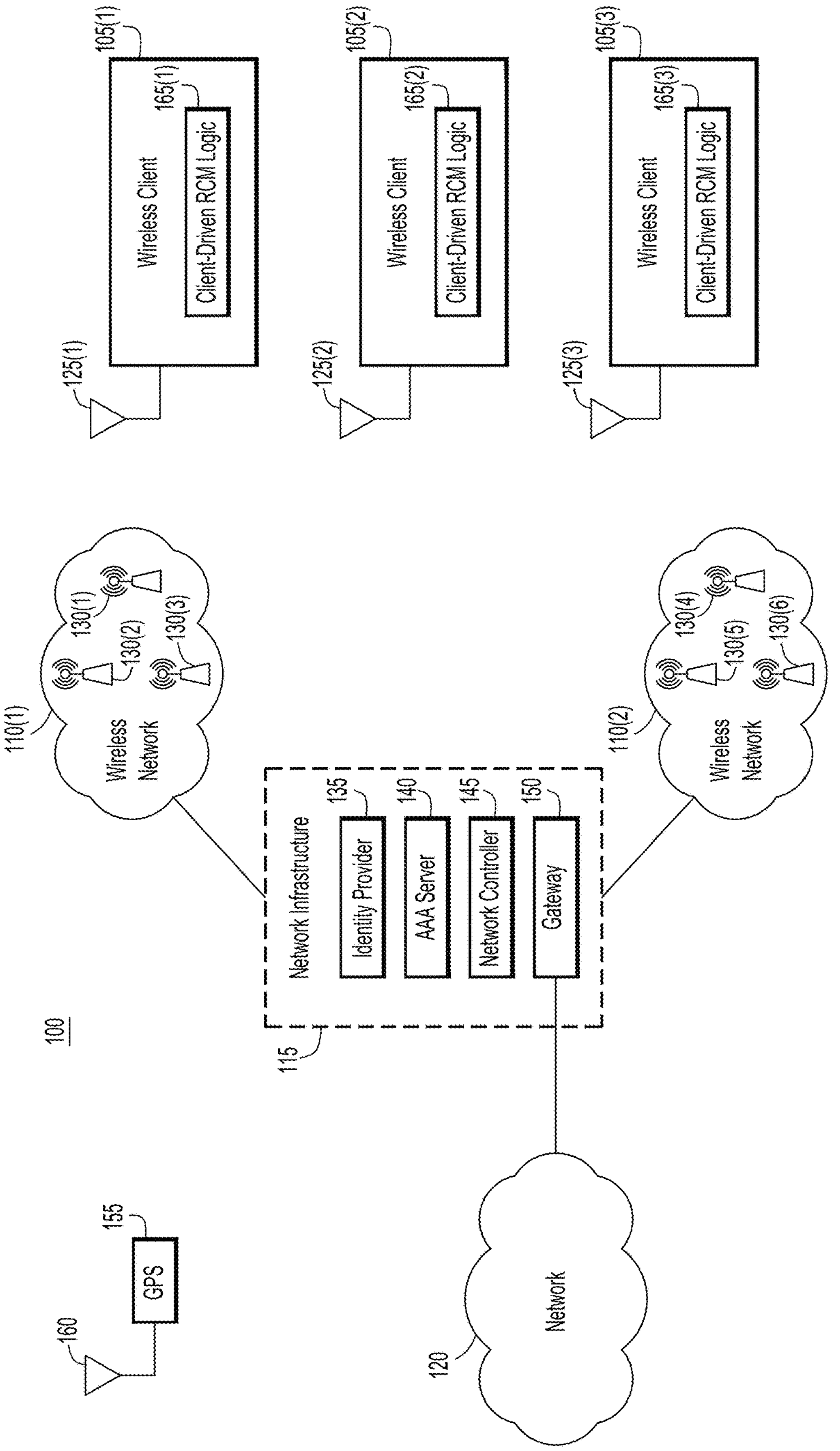
FIG. 1 illustrates a system configured to perform client-driven Randomized and Changing Media Access Control (MAC) address (RCM) techniques, according to an example embodiment.

FIG. 1 illustrates a system 100 configured to perform client-driven Randomized and Changing Media Access Control (MAC) address (RCM) techniques, according to an example embodiment. System 100 includes wireless clients 105(1)-105(3), wireless networks 110(1) and 110(2), network infrastructure 115, and network 120. Wireless clients 105(1)-105(3) include, respectively, antennas 125(1)-125(3). Wireless network 110(1) includes Access Points (APs) 130(1)-130(3), and wireless network 110(2) includes APs 130(4)-130(6). Network infrastructure 115 includes Identity Provider (IdP) 135, Authentication, Authorization, and Accounting (AAA) server 140, network controller 145, and gateway 150. System 100 further includes Global Positioning System (GPS) 155, which in turn includes antenna 160.

Wireless clients 105(1)-105(3) may be any suitable wireless client devices (e.g., stations) that are identified by one or more MAC addresses. Wireless clients 105(1)-105(3) may include a computer, a vehicle and/or any other transportation-related device having electronic devices configured thereon, an automation device, an enterprise device, an appliance, an Internet of Things (IoT) device, a Personal Digital Assistant (PDA), a laptop or electronic notebook, a cellular telephone, a smartphone, a tablet, an Internet Protocol (IP) phone, and/or any other device and/or combination of devices, components, elements, and/or objects. Antennas 125(1)-125(3) may facilitate respective over-the-air interfaces for wireless clients 105(1)-105(3) to access or connect to APs 130(1)-130(3). Thus, wireless clients 105(1)-105(3) may be configured to wirelessly communicate with wireless networks 110(1) and/or 110(2) via antennas 125(1)-125(3).

Wireless networks 110(1) and 110(2) may be any suitable type of network, such as Wireless Local Area Networks (WLANs). Wireless networks 110(1) and 110(2) may be public or open networks (e.g., public hotspots), or private or closed networks (e.g., a home or corporate/enterprise networks).

APs 130(1)-130(3) may be WLAN APs configured with appropriate hardware (e.g., processor(s), memory element(s), antennas and/or antenna arrays, baseband processors (modems), and/or the like), software, logic, and/or the like to provide over-the-air coverage for a WLAN access network (e.g., Wi-Fi®). In various embodiments, APs 130(1)-130(3) may be implemented as Wi-Fi APs and/or the like. APs 130(1)-130(3) may provide wireless connectivity, such as Electrical and Electronics Engineers (IEEE) 802.11 wireless connectivity (and variants thereof) for wireless clients 105(1)-105(3), which may access network infrastructure 115 and network 120 through the APs 130(1)-130(3).

IdP 135 may provide access decisions (accept, reject, limited access, etc.), identity information, and/or the like for wireless clients (e.g., wireless clients 105(1)-105(3)) attempting to connect to one or more wireless networks (e.g., wireless networks 110(1) and 110(2)).

AAA server 140 may facilitate authentication/authorization services for wireless clients 105(1)-105(3). Authentication may refer to a process in which AAA server 140 authenticates the identities of wireless clients 105(1)-105(3), e.g., by providing evidence that wireless clients 105(1)-105(3) hold specific digital identities such as identifiers/identities and corresponding credentials, authentication attributes, etc. Authorization may refer to a process in which AAA server 140 determines whether a particular entity is authorized to perform a given activity, e.g., inherited from authentication when logging on to an application or service. In various instances, authorization may be determined based on a range of restrictions, such as time-of-day restrictions, physical location restrictions, or restrictions against multiple accesses by the same entity/user/device.

Network controller 145 may provide or be responsible for WLAN functions such as WLAN-based access authentication services, authorization services, intrusion prevention, Radio Frequency (RF) management, and/or the like to facilitate connectivity by wireless clients 105(1)-105(3) via one or more of APs 130(1)-130(3). In some examples, network controller 145 may be a WLAN Controller (WLC) or an evolved WLC (eWLC).

Gateway 150 may forward network communications between wireless networks 110(1) and 110(2), and network 120.

IdP 135, AAA server 140, network controller 145, and/or gateway 150 may be configured as separate entities or combined into one or more converged entities. In one example, IdP 135 and AAA server 140 may be combined as one entity. In another example, network controller 145 and gateway 150 may be combined as one entity. Any suitable combination of IdP 135, AAA server 140, network controller 145, and/or gateway 150 may be configured as a converged entity.

Network 120 may include any suitable network(s), including one or more Wide Area Networks (WANs) (e.g., the Internet) and/or one or more LANs.

GPS 155 may be configured to provide geographic location and tracking services to wireless clients 105(1)-105(3). GPS 155 and wireless clients 105(1)-105(3) may exchange information wirelessly via antennas 160 and 125(1)-125(3).

While system 100 illustrates three wireless clients (wireless clients 105(1)-105(3)) and two wireless networks (wireless networks 110(1) and 110(2)) each including three APs (APs 130(1)-130(3) and 130(4)-130(6)), the techniques described herein may be compatible with any suitable number of wireless clients, wireless networks, and/or APs. Other embodiments may be envisioned.

Wireless clients 105(1)-105(3) may be configured to rotate their MAC addresses in accordance with RCM techniques. One or more of wireless clients 105(1)-105(3) may be connected to any of APs 130(1)-130(6); however, for purposes of the following description, it is assumed that wireless client 105(1) is wirelessly connected to network 120 via AP 130(1) of wireless network 110(1), and wireless clients 105(2) and 105(3) are wirelessly connected to network 120 via AP 130(4) of wireless network 110(2). For ease of discussion, specific reference will be made to wireless client 105(1), though it will be appreciated that the techniques described herein may also apply to wireless clients 105(2) and/or 105(3).

When wireless client 105(1) rotates its MAC address, both wireless client 105(1) and network infrastructure 115 may experience network disruptions. For example, after rotating its MAC address, wireless client 105(1) may momentarily lose connectivity with wireless network 110 (1), dropping current application connections. And if wireless client 105(1) also changes its Internet Protocol (IP) address during the RCM process, a user of wireless client 105(1) may need to re-establish the current application connections manually. MAC address rotation can also occupy resources of AP 130(1). As a result, rotating a MAC address too quickly can disrupt wireless client 105(1) and network infrastructure 115 while exhausting the resources of AP 130(1). On the other hand, rotating a MAC address too slowly can open wireless client 105(1) to attack (e.g., tracking/fingerprinting), as wireless client 105(1) loses the security benefits of RCM techniques.

Conventionally, wireless client 105(1) would rotate its MAC address too slow or fast. This is because AP 130(1) would signal to wireless client 105(1) when to rotate the MAC address, even though AP 130(1) may not necessarily be in the best position to determine when the rotation should occur. Thus, conventionally, AP 130(1) would prompt wireless client 105(1) to either rotate the MAC address too slow-resulting in increased security risk; or too fast-resulting in unnecessarily frequent network disruptions and exhaustion of AP resources.

Accordingly, in order to best exploit the benefits of MAC address rotation, client-driven RCM logic 165(1)-165(3) is provided on wireless clients 105(1)-105(3). Briefly, client-driven RCM logic 165(1)-165(3) may permit wireless clients 105(1)-105(3) to rotate their MAC addresses using a client-driven (rather than an AP-driven) approach. Because wireless clients 105(1)-105(3) may be better suited than APs 130(1)-130(6) to determine when the MAC addresses should be rotated, the client-driven approach enabled by client-driven RCM logic 165(1)-165(3) may permit wireless clients 105(1)-105(3) to rotate their MAC addresses fast enough to thwart possible security threats, yet slow enough to avoid undue network disruptions and exhaustion of AP resources.

As described herein, wireless clients 105(1)-105(3) may drive MAC address rotation using respective scores, each of which represent a level of security for one or more MAC addresses of wireless clients 105(1)-105(3). This score may be referred to herein as a "MAC address Observability Threat Score (MOTS)." Wireless clients 105(1)-105(3) may calculate client-specific MOTSs based on observations of system 100 and use the MOTSs to generate respective RCM schedules and frequencies.

In one example, the MOTS may be any number between 1 and 10 (inclusive), with 1 indicating that the current MAC address is at the lowest level of risk, and 10 indicating that the current MAC address is at the highest level of risk. A higher MOTS may correspond to a higher RCM frequency. Thus, for example, a MOTS of 1 may prompt wireless client 105(1) not to rotate its MAC address, whereas a MOTS of 10 may prompt wireless client 105(1) to rotate often (e.g., every two minutes). However, it will be appreciated that, in other examples, a lower score may correspond to a higher level of risk—and, thus, a higher RCM frequency—and a higher score may correspond to a lower level of risk—and, thus, a lower RCM frequency. Moreover, the score may be any suitable number/increment or any other suitable scoring system.

In one example, wireless client 105(1) may obtain data relating to a level of security for one or more MAC addresses of wireless client 105(1). Wireless client 105(1) may autonomously examine input criteria/information that is available from system 100, and/or autonomously determine/produce data. In some examples, wireless client may be configured to obtain environmental variables from system 100 (e.g., wireless network 110(1), network infrastructure 115, etc.).

Based on the data, wireless client 105(1) may compute the score that represents the level of security for the one or more MAC addresses (e.g., the MOTS). Wireless client 105(1) may compute the MOTS autonomously (e.g., at the operating system- or driver-level). Wireless client 105(1) may combine the data with an intrinsic/pre-set policy (e.g., group policy, hardware-dependent policy, etc.) to arrive at the MOTS. In some cases, wireless client 105(1) may determine that the network environment (e.g., wireless network 110(1)) is completely trustworthy/safe and, therefore, decide not to rotate the MAC address, assigning a MOTS of 1. In other cases, wireless client 105(1) may determine that the network environment is at least somewhat riskier and, therefore, decide to set a more aggressive RCM schedule, assigning a MOTS of greater than 1.

The wireless client 105(1) may determine, using the score, when or how frequently to rotate the one or more MAC addresses (e.g., establish an RCM schedule). Based on determining when or how frequently to rotate the one or more MAC addresses, wireless client 105(1) may rotate the one or more MAC addresses.

Specific examples of data relating to a level of security for one or more MAC addresses of wireless client 105(1) may include: (1) an indication of a type of authentication used in wireless network 110(1); (2) an indication of a number of other wireless clients and/or a number of other wireless networks that are in proximity to wireless client 105(1); (3) indication of whether wireless network 110(1) is public or private; (4) geographic/location information of wireless client 105(1); (5) venue information; (6) an indication of a type of event that is or will take place near wireless client 105(1); (7) an indication of a current time of day, week, month year, etc.; (8) an amount or a type of traffic on wireless network 110(1); (9) MOTSs that were previously computed by other wireless clients; or (10) a default score that represents an estimated level of security for the one or more MAC addresses of wireless client 105(1). Each example is discussed in turn below, though it will be appreciated that the techniques described herein may be compatible with any suitable data relating to a level of security for one or more MAC addresses of wireless client 105(1).

In one example, the data may include an indication of a type of authentication used in (offered by) wireless network 110(1). For instance, by associating with wireless network 110(1) via a web portal, wireless client 105(1) may determine that wireless network 110(1) uses a web portal, which may involve little or no authentication. Or, by associating with wireless network 110(1) via a wireless security protocol, wireless client 105(1) may determine that wireless network 110(1) uses that wireless security protocol. For example, wireless client 105(1) may associate with wireless network 110(1) via a trusted authentication method (e.g., 802.1X, Extensible Authentication Protocol (EAP), Wi-Fi Protected Access 3 (WPA3), etc.) or an older/outdated wireless security protocol (e.g., WPA2, etc.).

Wireless client 105(1) may compute the MOTS based on the indication of the type of authentication used in wireless network 110(1). For example, in response to associating to wireless network 110(1) using WPA3/EAP, wireless client 105(1) may determine that wireless network 110(1) is a fully trusted network. Accordingly, wireless client 105(1) may assign a MOTS of 1, meaning that wireless client 105(1) never rotates its MAC address. Or, if wireless network 110(1) uses an older/outdated wireless security protocol, such as WPA2, wireless client 105(1) may increase the MOTS and impose a rotation schedule of once every few hours. Thus, in some instances, certain mitigating circumstances (e.g., an older/outdated wireless security protocol) may prompt wireless client 105(1) to assign a higher MOTS, even if wireless network 110(1) uses 802.1X.

In another example, the data may include an indication of a number of other wireless clients (e.g., wireless clients 105(2) and 105(3)) and/or a number of other wireless networks (e.g., wireless network 110(2)) that are in proximity to wireless client 105(1). For instance, wireless client 105(1) may detect, via antenna 125(1), the general or relative client density on wireless network 110(1) and/or wireless network 110(2). Additionally/alternatively, wireless client 105(1) may detect, via antenna 125(1), competing/third-party wireless networks (e.g., wireless network 110(2)).

Wireless client 105(1) may compute the MOTS based on the indication of the number of other wireless clients and/or the number of other wireless networks that are in proximity to wireless client 105(1). For instance, a dense number of competing wireless clients or wireless networks in the vicinity may cause wireless client 105(1) to increase the MOTS (and the corresponding RCM frequency schedule)—even if wireless network 110(1) is trusted—because there are a higher number of potential listeners.

In another example, the data may include an indication of whether wireless network 110(1) is public or private. For instance, wireless client 105(1) may determine that wireless network 110(1) is a public or open network (e.g., a public hotspot), or a private or closed network (e.g., a home or corporate network). Wireless client 105(1) may compute the MOTS based on the indication of whether wireless network 110(1) is public or private. For example, if wireless network 110(1) is a well-known and trusted corporate WLAN or private hotspot, wireless client 105(1) may assign a lower MOTS. But if wireless network 110(1) is a public hotspot, wireless client 105(1) may automatically deem wireless network 110(1) as an implicitly unsecure/untrusted, well-known, risky hotspot, and thus increase the MOTS.

In another example, the data may include geographic/location information of wireless client 105(1). For instance, wireless client 105(1) may obtain, from GPS 155, an indication of the location of wireless client 105(1). Or, wireless client 105(1) may be pre-programmed with a location used to access wireless network 110(1). For example, if wireless network 110(1) is a corporate network, wireless client 105(1) may automatically determine its location in response to accessing wireless network 110(1).

Wireless client 105(1) may compute the MOTS based on the geographic/location information of wireless client 105(1). For example, certain locations may have higher threats of cyber-attacks. Those locations may be out-of-the-country locations (e.g., specific high-risk countries or specific high-risk areas within certain countries). Or those locations may be specific physical areas, such as outdoor areas, etc. In response to determining that it is in a high-risk location, wireless client 105(1) may increase the MOTS and thus rotate through MAC addresses more quickly. Or, if located in a trusted space, wireless client 105(1) may decrease the MOTS.

In another example, the data may include venue information. For instance, wireless client 105(1) may obtain, from AP 130(1), one or more Access Network Query Protocol (ANQP) elements that indicate the venue served by wireless network 110(1). The venue might be a hotel, airport, hospital, etc.

Wireless client 105(1) may compute the MOTS based on the venue information. For example, certain venue types may be riskier than others, and wireless client 105(1) may compute the MOTS accordingly (e.g., increasing the MOTS for riskier venues and decreasing the MOTS for safer venues).

In another example, the data may include an indication of a type of event that is or will take place near wireless client 105(1). Wireless client 105(1) may obtain the indication of the type of event from any suitable source, such as network 120 (e.g., one or more social networks or other websites), a calendar or email account associated with a user of wireless client 105(1), etc.

Wireless client 105(1) may compute the MOTS based on the event type. For example, certain event types may be riskier than others, and wireless client 105(1) may compute the MOTS accordingly (e.g., increasing the MOTS for riskier events and decreasing the MOTS for safer events). For instance, conferences focused on network security may be riskier for wireless client 105(1) because many of the conference attendees may have the capabilities to track MAC addresses.

In another example, the data may include an indication of a current time of day, week, month, year, etc. Wireless client 105(1) may obtain the indication of the current time from a local clock/calendar on wireless client 105(1), and/or from a clock/calendar service in the cloud.

Wireless client 105(1) may compute the MOTS based on the current time. For example, wireless client 105(1) may determine whether it is accessing wireless network 110(1) at times when cyber-attacks are more common on wireless network 110(1) and, if so, assign a higher MOTS.

In another example, the data may include an amount or a type of traffic on wireless network 110(1). For instance, by communicating with wireless network 110(1), wireless client 105(1) may determine whether wireless network 110(1) uses a secure protocol such as Hypertext Transfer Protocol Secure (HTTPS) or an unsecured mechanism such as unprotected User Datagram Protocol (UDP) for voice flows.

Wireless client 105(1) may compute the MOTS based on the amount or type of traffic. For example, in response to determining that there is a higher amount of traffic on wireless network 110(1), wireless client 105(1) may assign a higher MOTS, signaling that wireless network 110(1) is less secure. In another example, in response to determining that wireless network 110(1) uses a secure protocol, wireless client 105(1) may assign a lower MOTS; conversely, in response to determining that wireless network 110(1) uses an unsecured mechanism, wireless client 105(1) may assign a higher MOTS.

In another example, the data may include MOTSs that were previously computed by other wireless clients. The other wireless clients may share one or more characteristics with wireless client 105(1). For example, the other wireless clients may have computed their MOTSs in response to joining wireless network 110(1) via AP 130(1), like wireless client 105(1). In one example, wireless client 105(1) may obtain the previously computed MOTSs from AP 130(1), which may receive the MOTSs from the other wireless clients and, optionally, store the MOTSs.

Wireless client 105(1) may compute its MOTS based on the previously computed MOTSs. For example, if wireless client 105(1) observes a large number of high previously computed MOTSs, wireless client 105(1) may assign a higher MOTS. Or if wireless client 105(1) observes a large number of lower previously computed MOTSs, wireless client 105(1) may assign a lower MOTS.

In another example, the data may include a default/recommended/suggested score that represents an estimated level of security for the one or more MAC addresses of wireless client 105(1). The default score may be a default MOTS, and may be provided by AP 130(1), IdP 135, AAA server 140, or any other suitable network component. The default score may be set by a wireless operator, a Mobile Device Management (MDM) service, a group policy, etc.

In one example, IdP 135 may be configured to provide default scores that are specific to respective Access Network Providers (ANPs). For instance, a first ANP may include wireless network 110(1) and/or APs 130(1)-130(3), and a second ANP may include wireless network 110(2) and/or APs 130(4)-130(6). In one specific example, wireless client 105(1) joins the first ANP and connects to AP 130(1), and IdP 135 provides a default score to the first ANP and/or wireless client 105(1). The default score may be specific to the first ANP (and/or to a particular location or part of wireless network 110(1)).

IdP 135 may subscribe to a score assessment service configured to generate default scores for various ANPs. For example, the score assessment service may calculate the default score for the first ANP based on the history of the first ANP. If the first ANP has experienced an elevated level of wireless hacks, or if known exploits have originated from a certain hotspot provider associated with the first ANP, the score assessment service may assign a higher default score to the ANP. The score assessment service may calculate the default score for the first ANP based on any suitable data discussed above and/or any other suitable criteria relating to the level of security for the one or more MAC addresses. In one example, the score assessment service may calculate the default score based on crowdsourced data such as MOTSs that were previously computed by other wireless clients.

After computing the default score, the score assessment service may share the default score with IdP 135. IdP 135 may obtain the default score for the first ANP from the score assessment service and provide the default score to the first ANP and/or wireless client 105(1). IdP 135 may provide the default score using the OpenRoaming™ wireless authentication/authorization platform, if both the first ANP and IdP 135 are configured for OpenRoaming. OpenRoaming involves Domain Name System (DNS)-based identification of IdP 135 using DNS Name Authority Pointer (NAPTR) records to identify AAA server 140 to authenticate wireless client 105(1).

Thus, when wireless client 105(1) associates to the first ANP, IdP 135 and/or AAA server 140 may authenticate wireless client 105(1) via OpenRoaming and provide the default score for the first ANP. In one example, during an authentication process (e.g., an 802.1X authentication process), AAA server 140 may insert the default score in one or more Remote Authentication Dial-In User Service (RADIUS) attributes and send the RADIUS attribute(s) to wireless client 105(1). In a further example, IdP 135 may provide the default score to wireless client 105(1) via RADIUS over Transport Layer Security (TLS) (RadSec).

Wireless client 105(1) may compute the MOTS based on the default score. In one example, wireless client 105(1) may obtain the default score and further data relating to the level of security for the one or more MAC addresses (e.g., data discussed above). Based on the further data, wireless client 105(1) may modify (e.g., raise or lower) the default score to arrive at the client-driven MOTS. For example, if IdP 135 provides a higher default score because wireless network 110(1) is a hotspot that has experienced many recent cyber-attacks, but further data indicates that wireless network 110(1) can be trusted, wireless client 105(1) may lower the default score to arrive at the MOTS score.

Thus, wireless client 105(1) may ascertain the MOTS value and final RCM schedule by combining the default score with further data (e.g., observations of the network) and/or one or more policies of wireless client 105(1). Upon receiving the default score from IdP 135, wireless client 105(1) may combine the default score with other data and elements of one or more policies of wireless client 105(1) to create the RCM schedule based on the MOTS assessment.

Wireless client 105(1) may compute the MOTS based at least in part on user input/preferences indicating whether to trust a network and/or forgo MAC address rotation for usability purposes. For instance, a wireless client 105(1) may obtain a user indication that wireless network 110(1) is a home network and should therefore be trusted, even if wireless network 110(1) is a public WPA2—Pre-Shared Key (WPA2-PSK) network, which (e.g., similar to an open network) would otherwise be untrusted and therefore subject to frequent MAC address rotation. As a result, wireless client 105(1) may lower the MOTS, e.g., may decrease the MOTS to 1 such that wireless client 105(1) does not rotate the MAC address while connected to wireless network 110(1). In other examples, the user input may function as a user override of the MOTS, allowing the user to control the RCM schedule, regardless of the MOTS score. In either case, the user may provide input to enable smart detection of the network environment.

Upon computing the score, wireless client 105(1) may perform any suitable operation to enable client-driven RCM techniques. In one example, wireless client 105(1) may determine when or how frequently to rotate its MAC address(es). In another example, wireless client 105(1) may rotate a select number of bits of its MAC address(es). In still another example, wireless client 105(1) may report the score as data relating to a level of security for one or more other MAC addresses of one or more other wireless clients. Each of these examples is discussed in turn below. Other embodiments may be envisioned.

The wireless client 105(1) may, using the score, determine when or how frequently to rotate its MAC address(es). In one example, the frequency of rotation may be deterministic: for instance, a MOTS of 1 may correspond to MAC address rotation once every two minutes, a MOTS of 2 may correspond to MAC address rotation once every four minutes, a MOTS of 3 may correspond to MAC address rotation one every six minutes, etc.

In another example, the frequency of rotation may be non-deterministic. For instance, wireless client 105(1) may determine a given window within which to rotate the one or more MAC addresses, and select, from within the given window, a time at which to rotate the one or more MAC addresses. Thus, in one specific example, a MOTS of 8 may correspond to a window of between zero and five minutes, and wireless client 105(1) may randomly or pseudo-randomly select a time within that window at which to rotate its MAC address. This may result in faster rotations on average, and thus may correspond to riskier environments. In another specific example, a MOTS of 2 may correspond to a window of between zero and five hours, and wireless client 105(1) may randomly or pseudo-randomly select a time within that window at which to rotate its MAC address. This may result in slower rotations on average, and thus may correspond to more secure environments.

Additionally/alternatively, wireless client 105(1) may rotate a select number of bits of its MAC address(es). In one example, based on the score, wireless client 105(1) may determine a number of bits of the one or more MAC addresses to rotate, and rotate the number of bits of the one or more MAC addresses. For instance, a MOTS of 1 may signal to wireless client 105(1) to use the Burned-In Address (BIA) without rotation, whereas a MOTS of 10 may signal to wireless client 105(1) to randomize all bits of the MAC address. A MOTS between 1 and 10 may prompt wireless client 105(1) to randomize some, but not all, bits of the MAC address. The higher the MOTS, the more bits that wireless client 105(1) may randomize.

There are at least two advantages to controlling for the number of bits that are randomized during MAC address rotation. The first advantage is to lessen computational constraints on wireless client 105(1), as rotating fewer bits may involve fewer computational resources of wireless client 105(1). The second advantage is that wireless network 110(1) and/or other legitimate entities may be able to identify wireless client 105(1) as the same wireless client that used the previous MAC address before rotation. The fewer bits that are randomized, the higher the probability that the legitimate entities may be able to identify wireless client 105(1). Consider an example in which wireless network 110(1) is a legitimate entity (e.g., a private, corporate network). When it is able to identify wireless client 105(1), wireless network 110(1) may permit wireless client 105(1) to continue accessing secure documents after the MAC address rotation. Thus, in one example, wireless client 105(1) may randomize sufficiently few bits that wireless network 110(1) can track wireless client 105(1), but enough bits that a hacker could not.

Additionally/alternatively, wireless client 105(1) may report the score as data relating to a level of security for one or more other MAC addresses of one or more other wireless clients. Thus, wireless client 105(1) may share the MOTS for crowdsourcing purposes. In one example, wireless client 105(1) may provide its MOTS to AP 130(1), which may in turn provide the MOTS to other wireless clients that share one or more characteristics with wireless client 105(1), such as attempting to join wireless network 110(1) via AP 130(1). In another example, wireless client 105(1) may provide its MOTS to network infrastructure 115 (e.g., to IdP 135 and/or AAA server 140), which may in turn use the MOTS as input for calculating a default score to provide to other wireless clients that share one or more characteristics with wireless client 105(1), such as attempting to join wireless network 110(1) via AP 130(1). Any suitable number of wireless clients may report their respective MOTSs for crowdsourcing.

Wireless client 105(1) may dynamically re-compute/re-evaluate (e.g., modify) the score at any suitable time. In one example, wireless client 105(1) may re-compute the MOTS in response to a given amount of time elapsing since a previous computation of the MOTS. In another example, wireless client 105(1) may re-compute the MOTS in response to obtaining additional data relating to the level of security for the one or more MAC addresses. For instance, wireless client 105(1) may re-compute the MOTS each time wireless client 105(1) associates to a new AP (e.g., APs 130(2) or 130(3)) or wireless network (e.g., wireless network 110(2)). Thus, for example, moving to a more trusted space may cause wireless client 105(1) to decrease the score. In some examples, wireless client 105(1) may continually collect additional data and re-compute the score.

Figure 2:
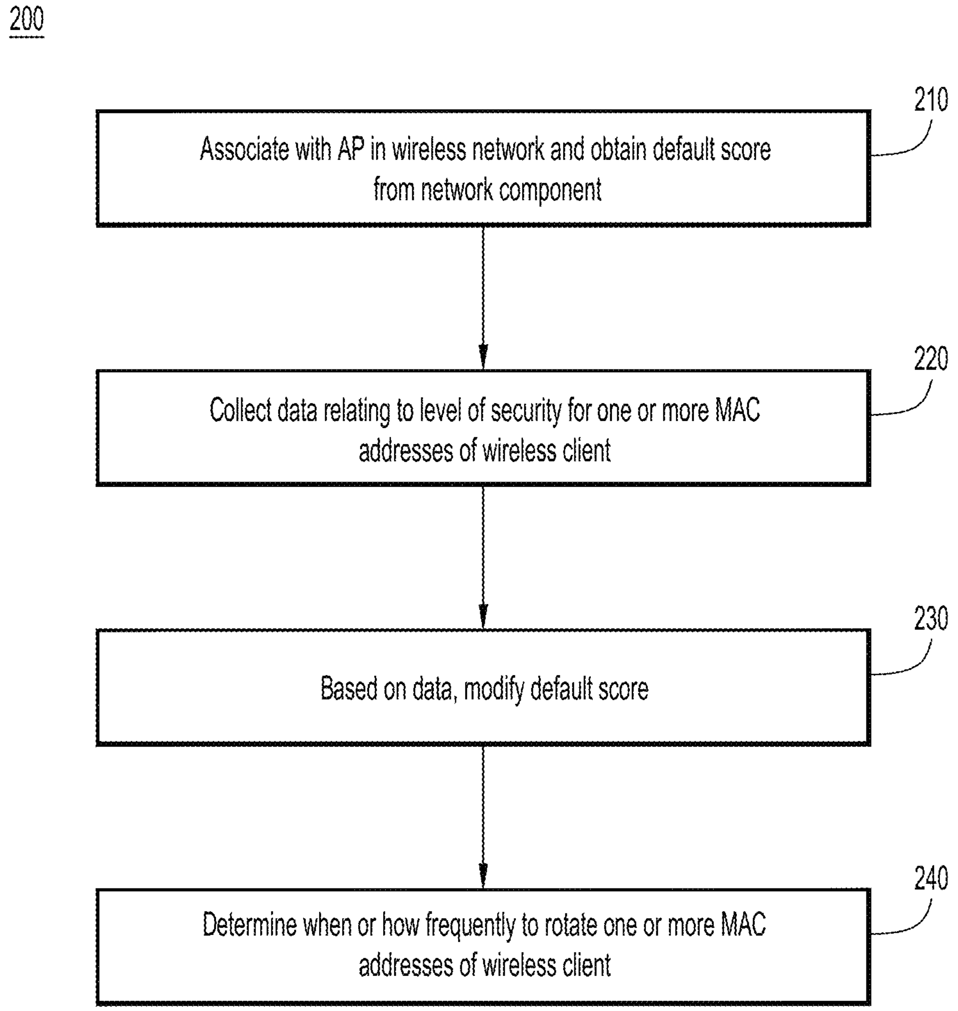
FIG. 2 illustrates a flowchart of a method for performing client-driven RCM techniques, according to an example embodiment.

FIG. 2 illustrates a flowchart of a method 200 for performing client-driven RCM techniques, according to an example embodiment. At operation 210, a wireless client associates with an AP in a wireless network and obtains a default score from a network component such as the AP, an IdP, a AAA server etc. The default score may represent an estimated level of security for one or more MAC addresses of the wireless client.

At operation 220, the wireless client may collect data relating to a level of security for one or more MAC addresses of the wireless client. The data may include any suitable data, including data discussed herein, such as: (1) an indication of a type of authentication used in the wireless network; (2) an indication of a number of other wireless clients and/or a number of other wireless networks that are in proximity to the wireless client; (3) an indication of whether the wireless network is public or private; (4)

geographic/location information of the wireless client; (5) venue information; (6) an indication of a type of event that is or will take place near the wireless client; (7) an indication of a current time of day, week, month year, etc.; (8) an amount or a type of traffic on the wireless network; (9) MOTSs that were previously computed by other wireless clients; or (10) a default score that represents an estimated level of security for the one or more MAC addresses of the wireless client.

At operation 230, the wireless client may modify (e.g., skew up or down) the default score based on the data to arrive at a MOTS for the wireless client. The data may change the default score depending on how the data indicates possible security threats have changed.

At operation 240, the wireless client may determine when or how frequently to rotate the one or more MAC addresses of the wireless client. For example, based on the MOTS, the wireless client may establish an RCM rotation frequency. As a result, the MOTS may ultimately map to an RCM frequency.

Figure 3:
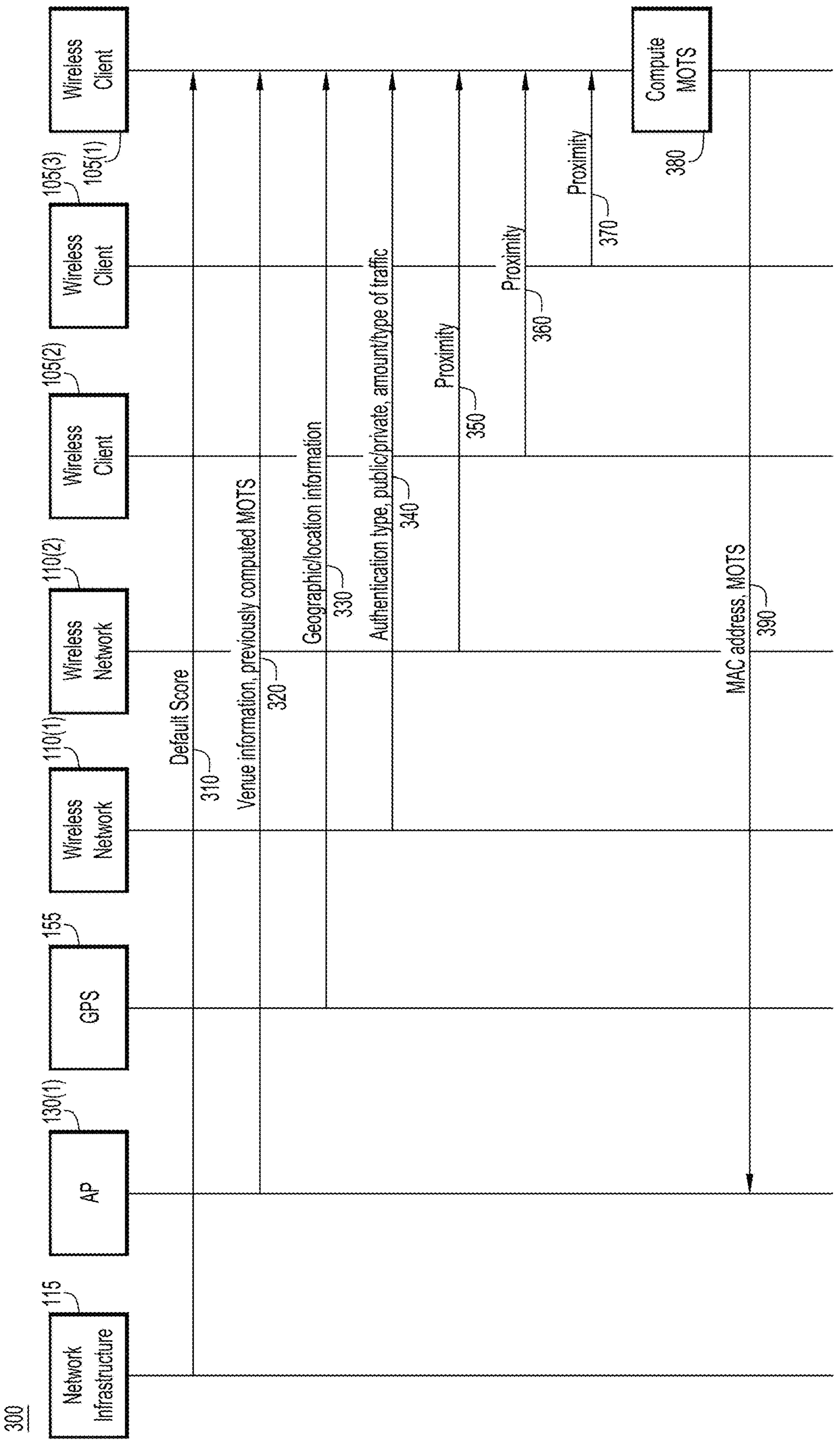
FIG. 3 illustrates a flow diagram of a method for performing client-driven RCM techniques, according to an example embodiment.

With reference to FIG. 1, FIG. 3 illustrates a flow diagram of a method 300 for performing client-driven RCM techniques, according to an example embodiment. Operations 310-370 involve wireless client 105(1) obtaining various examples of data relating to a level of security for one or more MAC addresses of wireless client 105(1) from network components in system 100.

At operation 310, wireless client 105(1) obtains, from network infrastructure 115, a default score that represents an estimated level of security for the one or more MAC addresses of wireless client 105(1). At operation 320, wireless client 105(1) obtains, from AP 130(1), venue information and MOTSs that were previously computed by other wireless clients. At operation 330, wireless client 105(1) obtains, from GPS 155, geographic/location information of wireless client 105(1). At operation 340, wireless client 105(1) obtains, from wireless network 110(1), an indication of a type of authentication used in the wireless network; an indication of whether the wireless network is public or private; and an amount or a type of traffic on wireless network 110(1). At operations 350, 360 and 370, wireless client 105(1) may obtain, from wireless network 110(2), wireless client 105(2), and wireless client 105(2), respective indications that wireless network 110(2), wireless client 105(2), and wireless client 105(2) are in proximity to wireless client 105(1).

It will be appreciated that, while FIG. 3 illustrates wireless client 105(1) obtaining specific examples of data, wireless client 105(1) may obtain any suitable data-even data that is not explicitly shown in FIG. 3. For example, wireless client 105(1) may obtain data such as an indication of a type of event that is or will take place near the wireless client and/or an indication of a current time of day, week, month year, etc., as discussed above.

At operation 380, based on the data, wireless client 105(1) may compute a MOTS that represents the level of security for the one or more MAC addresses. Using the MOTS, wireless client 105(1) may determine when or how frequently to rotate the one or more MAC addresses and, if appropriate, may rotate the one or more MAC addresses.

At operation 390, wireless client 105(1) may provide its MAC address to AP 130(1). For example, wireless client 105(1) may include the MAC address in network communications sent to network 120 via AP 130(1). The MAC address may be rotated (or not) in accordance with the determination as to when or how frequently to perform MAC address rotations. Wireless client 105(1) may also provide its MOTS to AP 130(1) for crowdsourcing purposes, as discussed above.

Figure 4:
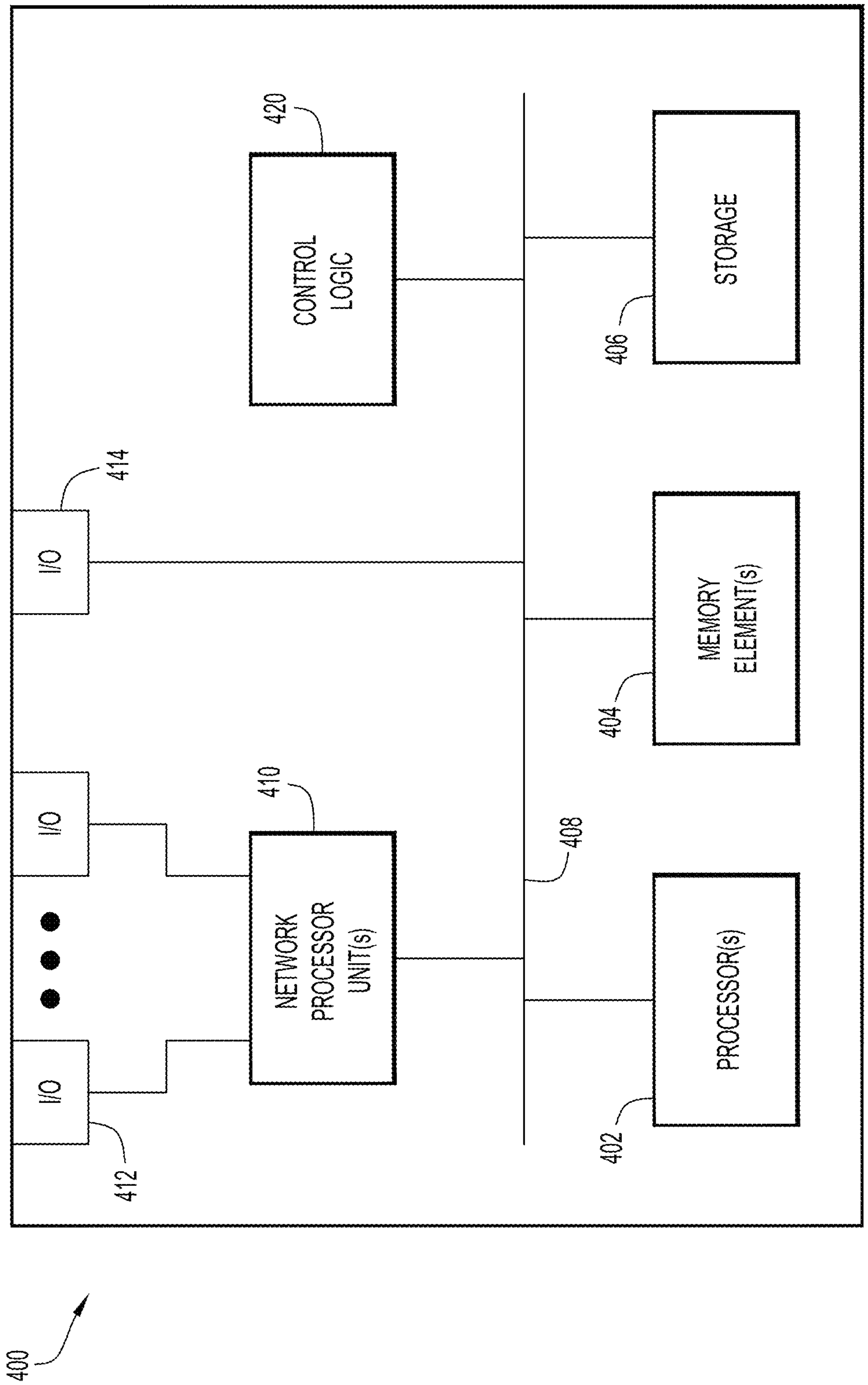
FIG. 4 illustrates a hardware block diagram of a computing device configured to perform functions associated with operations discussed herein, according to an example embodiment.

Referring to FIG. 4, FIG. 4 illustrates a hardware block diagram of a computing device 400 that may perform functions associated with operations discussed herein in connection with the techniques depicted in FIGS. 1-3. In various embodiments, a computing device, such as computing device 400 or any combination of computing devices 400, may be configured as any entity/entities (e.g., wireless client, AP, IdP, AAA server, network controller, etc.) as discussed for the techniques depicted in connection with FIGS. 1-3 in order to perform operations of the various techniques discussed herein.

In at least one embodiment, computing device 400 may include one or more processor(s) 402, one or more memory element(s) 404, storage 406, a bus 408, one or more network processor unit(s) 410 interconnected with one or more network input/output (I/O) interface(s) 412, one or more I/O interface(s) 414, and control logic 420. In various embodiments, instructions associated with logic for computing device 400 can overlap in any manner and are not limited to the specific allocation of instructions and/or operations described herein.

In at least one embodiment, processor(s) 402 is/are at least one hardware processor configured to execute various tasks, operations and/or functions for computing device 400 as described herein according to software and/or instructions configured for computing device 400. Processor(s) 402 (e.g., a hardware processor) can execute any type of instructions associated with data to achieve the operations detailed herein. In one example, processor(s) 402 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 404 and/or storage 406 is/are configured to store data, information, software, and/or instructions associated with computing device 400, and/or logic configured for memory element(s) 404 and/or storage 406. For example, any logic described herein (e.g., control logic 420) can, in various embodiments, be stored for computing device 400 using any combination of memory element(s) 404 and/or storage 406. Note that in some embodiments, storage 406 can be consolidated with memory elements 404 (or vice versa), or can overlap/exist in any other suitable manner.

In at least one embodiment, bus 408 can be configured as an interface that enables one or more elements of computing device 400 to communicate in order to exchange information and/or data. Bus 408 can be implemented with any architecture designed for passing control, data and/or information between processors, memory elements/storage, peripheral devices, and/or any other hardware and/or software components that may be configured for computing device 400. In at least one embodiment, bus 408 may be implemented as a fast kernel-hosted interconnect, potentially using shared memory between processes (e.g., logic), which can enable efficient communication paths between the processes.

In various embodiments, network processor unit(s) 410 may enable communication between computing device 400 and other systems, entities, etc., via network I/O interface(s) 412 to facilitate operations discussed for various embodiments described herein. In various embodiments, network processor unit(s) 410 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 400 and other systems, entities, etc. to facilitate operations for various embodiments described herein. In various embodiments, network I/O interface(s) 412 can be configured as one or more Ethernet port(s), Fibre Channel ports, and/or any other I/O port(s) now known or hereafter developed. Thus, the network processor unit(s) 410 and/or network I/O interfaces 412 may include suitable interfaces for receiving, transmitting, and/or otherwise communicating data and/or information in a network environment.

I/O interface(s) 414 allow for input and output of data and/or information with other entities that may be connected to computing device 400. For example, I/O interface(s) 414 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 420 can include instructions that, when executed, cause processor(s) 402 to perform operations, which can include, but not be limited to, providing overall control operations of computing device 400; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 420) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), Application Specific Integrated Circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 404 and/or storage 406 can store data, software, code, instructions (e.g., processor instructions), logic, parameters, combinations thereof, and/or the like used for operations described herein. This includes memory elements 404 and/or storage 406 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to computing device 400 for transfer onto another computer readable storage medium.

Figure 5:
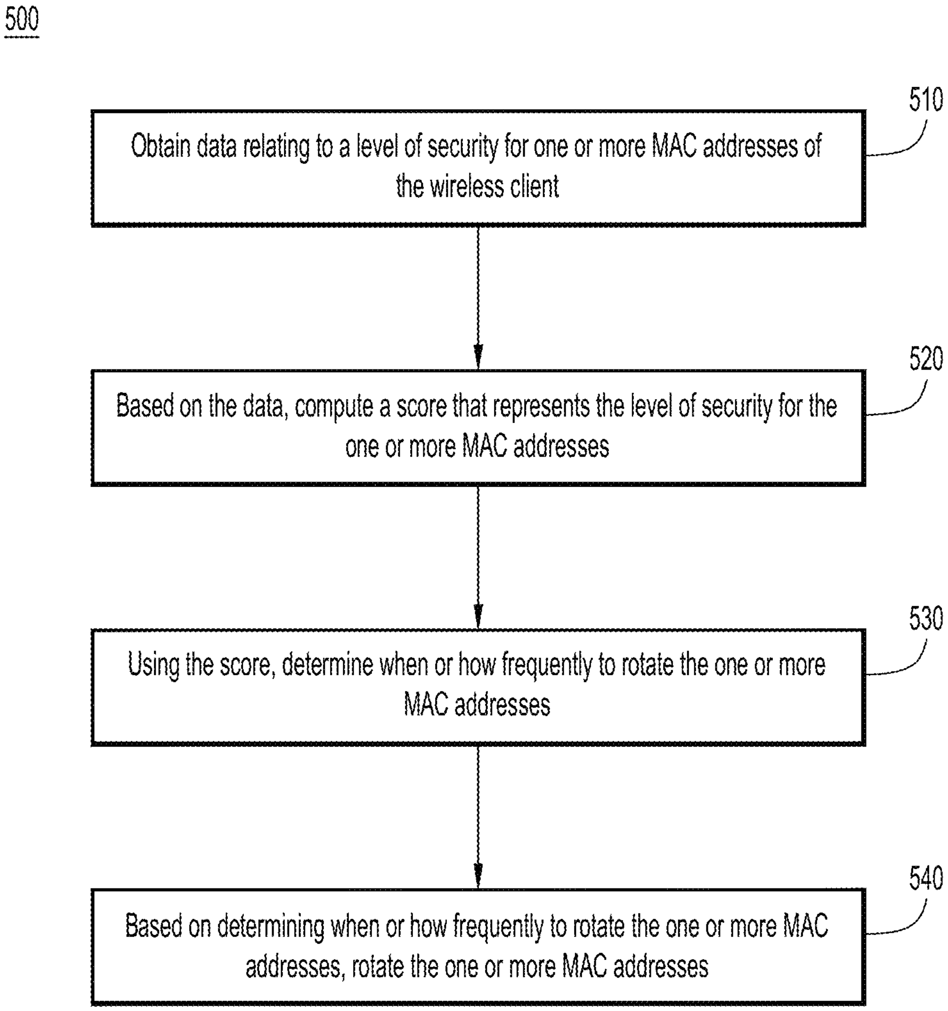
FIG. 5 illustrates a flowchart of a method for performing functions associated with operations discussed herein, according to an example embodiment.

FIG. 5 is a flowchart of an example method 500 for performing functions associated with operations discussed herein. Method 500 may be performed by any suitable entity, such as a wireless client configured to wirelessly communicate with a wireless network. At operation 510, the wireless client obtains data relating to a level of security for one or more MAC addresses of the wireless client. At operation 520, based on the data, the wireless client computes a score that represents the level of security for the one or more MAC addresses. At operation 530, using the score, the wireless client determines when or how frequently to rotate the one or more MAC addresses. At operation 540, based on determining when or how frequently to rotate the one or more MAC addresses, the wireless client rotates the one or more MAC addresses.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M)

network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In one form, a method is provided. The method comprises: at a wireless client configured to wirelessly communicate with a wireless network: obtaining data relating to a level of security for one or more MAC addresses of the wireless client; based on the data, computing a score that represents the level of security for the one or more MAC addresses; using the score, determining when or how frequently to rotate the one or more MAC addresses; and based on determining when or how frequently to rotate the one or more MAC addresses, rotating the one or more MAC addresses.

In one example, obtaining the data includes: obtaining a default score that represents an estimated level of security for the one or more MAC addresses; and obtaining further data relating to the level of security for the one or more MAC addresses; and computing the score includes modifying the default score based on the further data.

In one example, the method further comprises: based on the score, determining a number of bits of the one or more MAC addresses to rotate; and rotating the number of bits of the one or more MAC addresses.

In one example, the method further comprises: reporting the score as data relating to a level of security for one or more other MAC addresses of one or more other wireless clients.

In one example, determining when or how frequently to rotate the one or more MAC addresses includes: determining a given window within which to rotate the one or more MAC addresses; and selecting, from within the given window, a time at which to rotate the one or more MAC addresses.

In one example, obtaining the data includes: obtaining an indication of whether the wireless network is public or private.

In one example, obtaining the data includes: obtaining an indication of a type of authentication used in the wireless network.

In one example, obtaining the data includes: obtaining an indication of a number of other wireless clients and/or a number of other wireless networks that are in proximity to the wireless client.

In one example, the method further comprises: re-computing the score; and in response to re-computing the score, changing when or how frequently to rotate the one or more MAC addresses.

In another form, an apparatus is provided. The apparatus comprises: a network interface configured to wirelessly communicate with a wireless network; and one or more processors coupled to the network interface, wherein the one or more processors are configured to: obtain data relating to a level of security for one or more MAC addresses of the apparatus; based on the data, compute a score that represents the level of security for the one or more MAC addresses; using the score, determine when or how frequently to rotate the one or more MAC addresses; and based on determining when or how frequently to rotate the one or more MAC addresses, rotate the one or more MAC addresses.

In another form, one or more non-transitory computer readable storage media are provided. The non-transitory computer readable storage media are encoded with instructions that, when executed by a processor of a wireless client configured to wirelessly communicate with a wireless network, cause the processor to: obtain data relating to a level of security for one or more MAC addresses of the wireless client; based on the data, compute a score that represents the level of security for the one or more MAC addresses; using the score, determine when or how frequently to rotate the one or more MAC addresses; and based on determining when or how frequently to rotate the one or more MAC addresses, rotate the one or more MAC addresses.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:

obtaining, at a wireless station device operating in a wireless network, a default score relating to a level of security for one or more of a plurality of Media Access Control (MAC) addresses that may be used by the wireless station device, the default score relating to the level of security being specific to an access network provider for the wireless network and the default score being obtained via a wireless access point device to which the wireless station device is wirelessly connected;

based at least in part on the default score, determining, at the wireless station device, when or how frequently the wireless station device is to rotate between addresses of the plurality of MAC addresses;

based on determining when or how frequently to rotate between addresses of the plurality of MAC addresses, rotating from a first address of the plurality of MAC addresses used by the wireless station device to a second address of the plurality of MAC addresses; and computing a score related to the level of security of the one or more of the plurality of MAC addresses after rotating from the first address to the second address.

2. The method of claim 1, further comprising the wireless station device modifying the default score to produce a modified score related to the level of security of the plurality of MAC addresses, and wherein determining is performed based on the modified score.

3. The method of claim 2, wherein rotating from the first address of the plurality of MAC addresses used by the wireless station device to the second address of the plurality of MAC addresses comprises:

based on the modified score, determining a number of bits of the first address of the plurality of MAC addresses to rotate; and generating the second address of the plurality of MAC addresses by rotating the number of bits of the first address of the plurality of MAC addresses.

4. The method of claim 2, further comprising:

reporting the modified score as data relating to a level of security for one or more other MAC addresses of one or more other wireless station devices.

5. The method of claim 1, wherein determining when or how frequently to rotate between the addresses of the plurality of MAC addresses includes:

determining a given window within which to rotate between the addresses of the plurality of MAC addresses; and selecting, from within the given window, a time at which to rotate between the addresses of the plurality of MAC addresses.

6. The method of claim 1, wherein obtaining further includes:

obtaining an indication of whether the wireless network is public or private.

7. The method of claim 1, wherein the default score has been generated by a score assessment service for the access network provider for the wireless network.

8. The method of claim 1, wherein obtaining further includes:

obtaining an indication of a number of other wireless station devices and/or a number of other wireless networks that are in proximity to the wireless station device.

9. An apparatus comprising:

a wireless network interface configured to wirelessly communicate with a wireless network on behalf of a wireless station device operating in the wireless network; and one or more processors coupled to the wireless network interface, wherein the one or more processors are configured to perform operations including:

obtaining a default score relating to a level of security for one or more of a plurality of Media Access Control (MAC) addresses that may be used by the wireless station device, the default score relating to the level of security being specific to an access network provider for the wireless network and the default score being obtained via a wireless access point device to which the wireless station device is wirelessly connected;

based at least in part on the default score, determining, when or how frequently to rotate between addresses of the plurality of MAC addresses;

based on determining when or how frequently to rotate between addresses of the plurality of MAC addresses, rotating from a first address of the plurality of MAC addresses to a second address of the plurality of MAC addresses; and computing a score related to the level of security of the one or more of the plurality of MAC addresses after rotating from the first address to the second address.

10. The apparatus of claim 9, wherein the one or more processors are configured to modify the default score to produce a modified score related to the level of security of the plurality of MAC addresses, and wherein determining is performed based on the modified score.

11. The apparatus of claim 10, wherein the one or more processors are configured to perform rotating from the first address of the plurality of MAC addresses used by the wireless station device to the second address of the plurality of MAC addresses by:

based on the modified score, determining a number of bits of the first address of the plurality of MAC addresses to rotate; and generating the second address of the plurality of MAC addresses by rotating the number of bits of the first address of the plurality of MAC addresses.

12. The apparatus of claim 10, wherein the one or more processors are further configured to perform:

reporting the modified score as data relating to a level of security for one or more other MAC addresses of one or more station devices.

13. The apparatus of claim 9, wherein the one or more processors are configured to perform determining when or how frequently to rotate between the addresses of the plurality of MAC addresses by:

determining a given window within which to rotate between the addresses of the plurality of MAC addresses; and selecting, from within the given window, a time at which to rotate between the addresses of the plurality of MAC addresses.

14. The apparatus of claim 9, wherein the one or more processors are configured to perform:

obtaining an indication of whether the wireless network is public or private.

15. The apparatus of claim 9, wherein the default score has been generated by a score assessment service for the access network provider for the wireless network.

16. One or more non-transitory computer readable storage media encoded with instructions that, when executed by a processor of a wireless station device configured to wirelessly communicate in a wireless network, cause the processor to perform operations including:

obtaining a default score relating to a level of security for one or more of a plurality of Media Access Control (MAC) addresses that may be used by the wireless station device, the default score relating to the level of security being specific to an access network provider for the wireless network and the default score being obtained via a wireless access point device to which the wireless station device is wirelessly connected;

based at least in part on the default score, determining when or how frequently the wireless station device is to rotate between addresses of the plurality of MAC addresses;

based on determining when or how frequently to rotate between addresses of the plurality of MAC addresses, rotating from a first address of the plurality of MAC addresses used by the wireless station device to a second address of the plurality of MAC addresses; and computing a score related to the level of security of the one or more of the plurality of MAC addresses after rotating from the first address to the second address.

17. The one or more non-transitory computer readable storage media of claim 16, further comprising instructions that cause the processor to perform:

modifying the default score to produce a modified score related to the level of security of the plurality of MAC addresses, and wherein determining is performed based on the modified score.

18. The one or more non-transitory computer readable storage media of claim 17, wherein the instructions cause the processor to perform rotating from the first address of the plurality of MAC addresses used by the wireless station device to the second address of the plurality of MAC addresses by:

based on the modified score, determining a number of bits of the first address of the plurality of MAC addresses to rotate; and generating the second address of the plurality of MAC addresses by rotating the number of bits of the first address of the plurality of MAC addresses.

19. The one or more non-transitory computer readable storage media of claim 16, wherein the default score has been generated by a score assessment service for the access network provider for the wireless network.

20. The one or more non-transitory computer readable storage media of claim 16, wherein the instructions cause the processor to perform obtaining the default score by:

obtaining an indication of whether the wireless network is public or private.

* * * * *